(12) United States Patent
Koo et al.

(10) Patent No.: US 7,739,518 B2
(45) Date of Patent: Jun. 15, 2010

(54) METHOD FOR SECURING DOCSIS CABLE MODEM AGAINST PHYSICAL SECURITY ATTACKS

(75) Inventors: Han-Seung Koo, Daejon (KR); Joon-Young Jung, Daejon (KR); Eun-Jung Kwon, Daejon (KR); O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1009 days.

(21) Appl. No.: 11/483,999

(22) Filed: Jul. 10, 2006

(65) Prior Publication Data
US 2007/0039061 A1    Feb. 15, 2007

(30) Foreign Application Priority Data
Dec. 8, 2005    (KR) ............. 10-2005-0119589

(51) Int. Cl.
G06F 11/30    (2006.01)
G06F 12/14    (2006.01)
(52) U.S. Cl. .............. 713/193; 370/389; 370/480; 725/111; 725/119
(58) Field of Classification Search .......... 713/193
See application file for complete search history.

(56) References Cited
U.S. PATENT DOCUMENTS

| | | | | |
|---|---|---|---|---|
| 5,841,865 A | * | 11/1998 | Sudia | 380/286 |
| 5,991,519 A | * | 11/1999 | Benhammou et al. | 726/3 |
| 6,233,685 B1 | * | 5/2001 | Smith et al. | 713/194 |
| 6,473,861 B1 | * | 10/2002 | Stokes | 713/193 |
| 7,269,725 B2 | * | 9/2007 | Cromer et al. | 713/100 |
| 7,463,739 B2 | * | 12/2008 | Couillard | 380/284 |
| 2003/0026427 A1 | * | 2/2003 | Couillard | 380/277 |
| 2005/0027985 A1 | * | 2/2005 | Sprunk et al. | 713/171 |
| 2008/0109904 A1 | * | 5/2008 | In et al. | 726/22 |

FOREIGN PATENT DOCUMENTS

KR    2000-0045271    7/2000

* cited by examiner

*Primary Examiner*—Taghi T Arani
*Assistant Examiner*—Justin T Darrow
(74) *Attorney, Agent, or Firm*—Ladas & Parry LLP

(57) ABSTRACT

Provided is a method for securing cable modem (CM) following a Data Over Cable Service Interface Specification (DOCSIS) against physical security attacks. The method includes the steps of: a) classifying information to be stored in the DOCSIS CM based on a requirement degree of confidentiality and anti-alteration; b) storing the information in a non-volatile memory of the DOCSIS CM when the information is absolute confidential information, but processing a mechanism for deleting the information stored in the non-volatile memory in case that attacks by a hacker is sensed; c) storing the information in the non-volatile memory of the DOCSIS CM when the information is middle-level security information; and d) storing the information in a write-once (WO) memory of the DOCSIS CM when the information is absolute anti-alteration information.

8 Claims, 2 Drawing Sheets

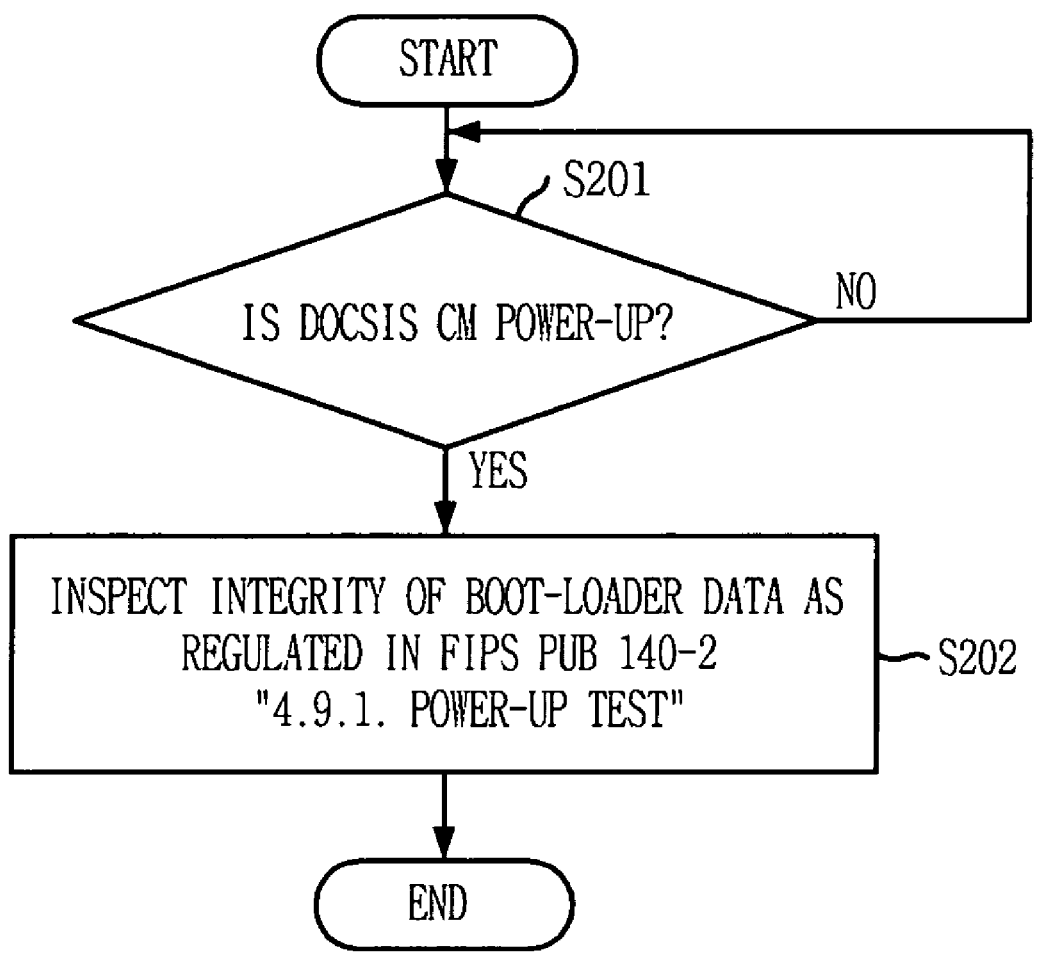

METHOD FOR SECURING DOCSIS CABLE MODEM AGAINST PHYSICAL SECURITY ATTACKS

FIELD OF THE INVENTION

The present invention relates to a method for securing a cable modem (CM) based on Data Over Cable Service Interface Specification (DOCSIS) against physical security attacks; and, more particularly, to a method for securing a DOCSIS CM for efficiently protecting major data requiring security without raising a physical security level regulated in Federal Information Processing Standards Publication 140-2 (FIPS PUB 140-2) against physical attacks of hackers who make access to a computer system of files without permission, and steal, change, or destroy information.

DESCRIPTION OF RELATED ART

A basic physical security level suggested in a Data Over Cable Service Interface Specification (DOCSIS) standard, which is an international standard, is a level 1, which is the lowest level among security levels regulated in Federal Information Processing Standards Publication 140-2 (FIPS PUB 140-2).

The DOCSIS specification regulates that a cable modem' Rivest-Shamir-Adelman (RSA) private/public key pair and a CM's certificate should be stored in a write-once (WO) memory to be protected from physical security attacks. It also regulates that CableLabs' or manufacturer's certificate requiring security, and CableLabs's or Manufacturer's RSA public key should be stored in a general non-volatile memory.

Although it is necessary not to change boot-loader data of the DOCSIS CM should not be changed, a method against physical attacks is not specified in the standard.

As described in the above, the physical security level of the CM regulated in the DOCSIS standard is suggested as a level 1, which is basically regulated in the FIPS PUB 140-2. The DOCSIS standard only regulates that data requiring security should be stored in a specific memory.

There is a high possibility in the regulation of the DOCSIS standard that the major data can be easily exposed and changed by the physical attacks of professional hackers. It is because the level 1 of the FIPS PUB 140-2 has a low security level, for example, is suggested to coat or seal up a device for physical security.

Raising the physical security level regulated in the FIPS PUB 140-2 to a level 3 has been a conventional method for solving the above problem. However, since the unit cost of the CM and business operation costs increase by the raise of the security level, the method is not welcomed by cable communication manufacturers.

SUMMARY OF THE INVENTION

It is, therefore, an object of the present invention to provide a method for securing a cable modem (CM) following Data Over Cable Service Interface Specification (DOCSIS) for efficiently protecting major data requiring security from physical attacks of hackers without raising a physical security level regulated in Federal Information Processing Standards Publication 140-2 (FIPS PUB 140-2).

Other objects and advantages of the present invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for securing the CM following the DOCSIS against physical security attacks, the method including the steps of: a) classifying information to be stored in the DOCSIS CM based on a requirement degree of confidentiality and anti-alteration; b) storing the information in a non-volatile memory of the DOCSIS CM when the information is absolute confidential information, but processing a mechanism for deleting the information stored in the non-volatile memory in case that attacks by a hacker is sensed; c) storing the information in the non-volatile memory of the DOCSIS CM when the information is middle-level security information; and d) storing the information in a write-once (WO) memory of the DOCSIS CM when the information is absolute anti-alteration information. The method further includes the step of: e) checking integrity of the absolute anti-alteration information stored in the WO memory whenever the power of the DOCSISCM turns on.

In accordance with another aspect of the present invention, there is provided a method for securing the CM following the DOCSIS against physical security attacks, the method including the steps of: a) classifying information to be stored in the DOCSIS CM based on a requirement degree of confidentiality and anti-alteration; b) storing the information in a non-volatile memory of the DOCSIS CM by performing key encapsulation on the information when the information to be stored is absolute confidential information; c) storing the information in the non-volatile memory of the DOCSIS CM when the information is middle-level security information; and d) storing the information in a WO memory of the DOCSIS CM when the information is absolute anti-alteration information. The method further includes the step of: e) checking integrity of the absolute anti-alteration information stored in the WO memory whenever the power of the DOCSISCM turns on.

When the attacks of the hacker are expected in storing of critical data, the present invention uses the mechanism for deleting information of the memory, i.e., key zeroization, or guides the physical attacks by the method for storing the data through the key encapsulation process. Also, the present invention checks the integrity of the boot-loader data through "Power-up Test" regulated in the FIPS PUB 140-2 whenever the power of the CM turns on.

BRIEF DESCRIPTION OF THE DRAWINGS

The above and other objects and features of the present invention will become apparent from the following description of the preferred embodiments given in conjunction with the accompanying drawings, in which:

FIG. 2 is a flowchart describing a method for checking whether the DOCSIS CM boot-loader is changed in accordance with the embodiment of the present invention.

DETAILED DESCRIPTION OF THE INVENTION

Figure 1:
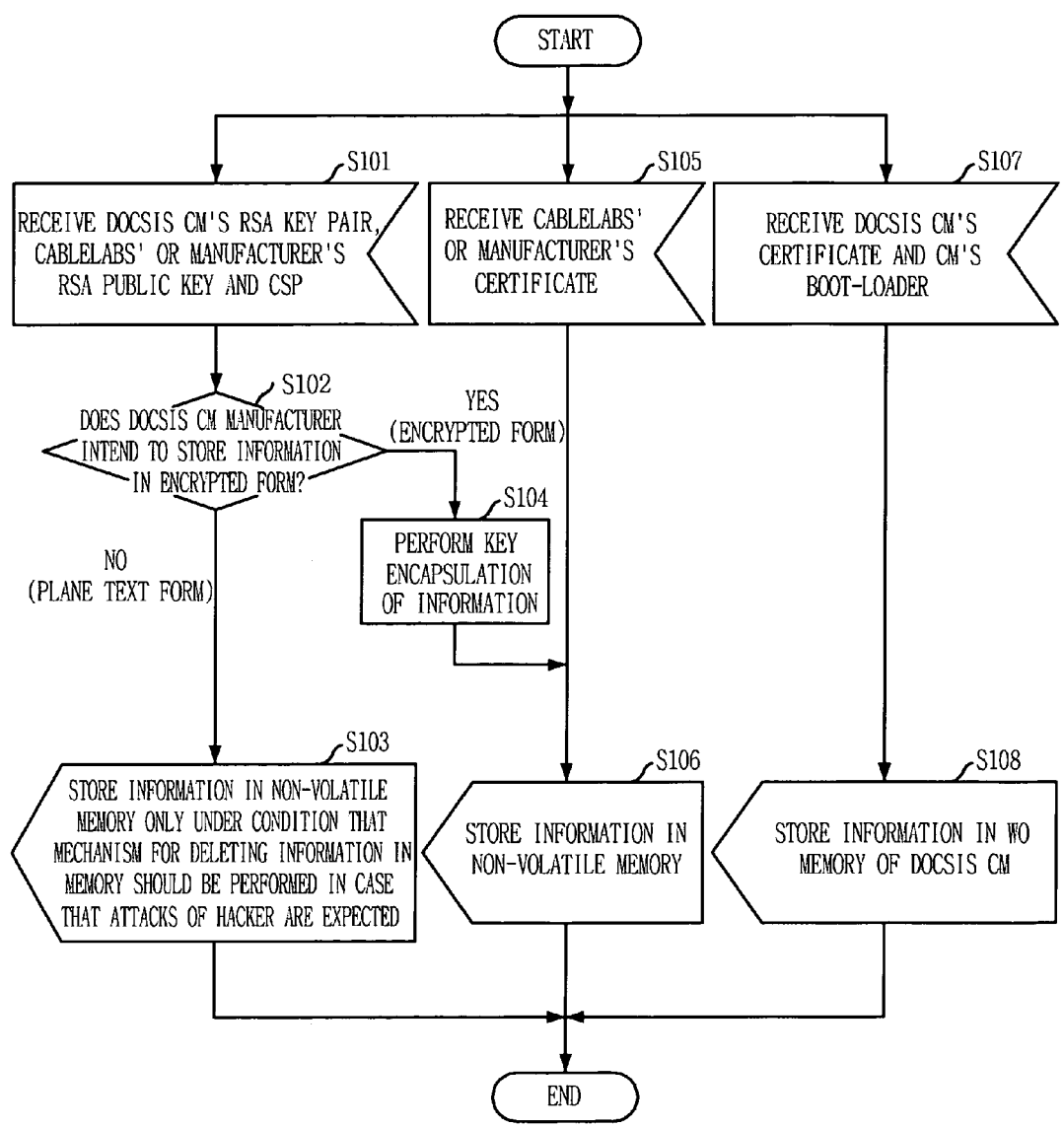
FIG. 1 is a flowchart describing a method for securing a Data Over Cable Service Interface Specification (DOCSIS) cable modem (CM) against physical security attacks in accordance with an embodiment of the present invention.

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

FIG. 1 is a flowchart describing a method for securing a Data Over Cable Service Interface Specification (DOCSIS) cable modem (CM) against physical security attacks in accordance with an embodiment of the present invention. It shows a DOCSIS CM security information storing policy.

According to the present invention, when a DOCSIS CM is manufactured, a DOCSIS CM manufacturer regulates how to store a DOCSIS CM' Rivest-Shamir-Adelman (RSA) private/public key pair, a CableLabs' or Manufacturer's RSA public key, Critical Security Parameter (CSP), a CableLabs' or manufacturer's certificate, a DOCSIS CM's certificate and a DOCSIS CM's boot-loader in a memory of the DOCSIS CM to protect them from physical security attacks of hackers or crackers based on a DOCSIS Baseline Privacy Interface (BPI) standard. It is also regulated what kind of memory is used to store the above informations.

The modem receives the CM's RSA public/private key pair, the CableLabs' or Manufacturer's RSA public key and the CSP at step S101, receives the CableLabs' or manufacturer's certificate at step S105, and receives the CM's certificate and the CM's boot-loader at step S107.

That is, the present invention differentiates a memory and a storing method based on a type of the information to be stored. The information to be stored is classified into 'absolute confidential information', 'absolute anti-alteration information' and 'middle-level security information' based on a degree of confidentiality requirement and anti-alteration requirement. The 'absolute confidential information' requires to absolutely secure the confidentiality and the 'absolute anti-alteration information' requires to absolutely restrict the modulation.

When the information to be stored is the 'absolute confidential information', i.e., the CM's RSA key pair, the CableLabs's or Manufacturer's RSA public key and the CSP of the DOCSIS CM, the information is stored at step S102 by selectively using the following two methods based on whether the DOCSIS CM manufacturer intends to store the information in an encrypted form or in a plane text form.

When the DOCSIS CM manufacturer intends to store the above information in the memory in the plane text form, the information is stored in a non-volatile memory at step S103 only under a condition that a mechanism for deleting the information in the memory, i.e., key zeroization, should be performed in case that attacks of a hacker are expected.

On the contrary, when the DOCSIS CM manufacturer intends to store the information in the encrypted form, key encapsulation of the information is performed at step S104, and the information is stored in the non-volatile memory at step S106.

When the information to be stored is the 'middle-level security information', i.e., the CableLabs' or Manufacturer's certificate, it is necessary to store the information in the non-volatile memory of the CM at step S106.

When the information to be stored is the 'absolute anti-alteration information', i.e., the DOCSIS CM's certificate and boot-loader, it is necessary to store the information in the WO memory of the CM at step S108.

FIG. 2 is a flowchart describing a method for checking whether the DOCSIS CM boot-loader is changed in accordance with the embodiment of the present invention.

The boot-loader of the DOCSIS CM should not be alterable in any cases.

To check the alterability, the integrity of boot-loader data is checked at step S202 as regulated in FIPS PUB 140-2 "4.9.1. Power-up Test" whenever the power of the DOCSIS CM turns on at step S201.

Through the present invention, the DOCSIS CM manufacturer satisfies the level 1, which is the lowest level among the security levels regulated in the FIPS PUB 140-2, and can efficiently cope with the DOCSIS CM physical security attacks by the hacker.

Since the DOCSIS CM manufacturer does not need to select a high security level of the FIPS PUB 140-2 to guard against the physical security attacks by the hacker, the present invention can reduce a manufacturing cost.

Whenever the power of the DOCSIS CM turns on, the method of the present invention checks whether the DOCSIS CM boot-loader is changed based on the method regulated in the FIPS PUB 140-2 4.9.1. Power-up Test. Accordingly, the present invention can easily confirm the integrity of the boot-load.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0119589, filed with the Korean Intellectual Property Office on Dec. 8, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for securing a cable modem (CM) following Data Over Cable Service Interface Specification (DOCSIS) against physical security attacks, comprising the steps of:
   a) classifying information to be stored in the DOCSIS CM based on a requirement degree of confidentiality and anti-alteration;
   b) storing the classified information in a non-volatile memory of the DOCSIS CM when the information is absolute confidential information, but processing a mechanism for deleting the information stored in the non-volatile memory in case that attacks by a hacker is sensed;
   c) storing the classified information in the non-volatile memory of the DOCSIS CM when the information is middle-level security information; and
   d) storing the classified information in a write-once (WO) memory of the DOCSIS CM when the information is absolute anti-alteration information, wherein a security level of the absolute anti-alteration information does not exceed level 1 of the Federal Information Processing Standards Publication 140-2 (FIPS PUB 140-2).

2. The method as recited in claim 1, further comprising the step of:
   e) checking integrity of the absolute anti-alteration information stored in the WO memory whenever the DOCSIS CM turns on.

3. The method as recited in claim 2, wherein it is checked in the step e) whether the absolute anti-alteration information is changed as regulated in FIPS PUB 140-2 "4.9.1. Power-up Test" whenever the power of the DOCSISCM turns on.

4. The method as recited in claim 3, wherein the absolute confidential information includes a DOCSIS CM' Rivest-Shamir-Adelman (RSA) private/public key pair, a Cable-Labs' or Manufacturer's RSA public key and Critical Security Parameter (CSP); the middle-level security information includes a CableLabs' or manufacturer's certificate; and the absolute anti-alteration information includes CM's certificate and boot-loader.

5. A method for securing cable modem (CM) following a Data Over Cable Service Interface Specification (DOCSIS) against physical security attacks, comprising the steps of:
   a) classifying information to be stored in the DOCSIS CM based on a requirement degree of confidentiality and anti-alteration;
   b) storing the classified information in a non-volatile memory of the DOCSIS CM by performing key encapsulation on the information when the information to be stored is absolute confidential information;
   c) storing the classified information in the non-volatile memory of the DOCSIS CM when the information is middle-level security information; and
   d) storing the classified information in a write-once (WO) memory of the DOCSIS CM when the information is absolute anti-alteration information.

6. The method as recited in claim 5, further comprising the step of:
   e) checking integrity of the absolute anti-alteration information stored in the WO memory whenever the DOCSISCM turns on.

7. The method as recited in claim 6, wherein it is checked in the step e) whether the absolute anti-alteration information is changed as regulated in FIPS PUB 140-2 "4.9.1. Power-up Test" whenever the power of the DOCSISCM turns on.

8. The method as recited in claim 7, wherein the absolute confidential information includes a DOCSIS CM' Rivest-Shamir-Adelman (RSA) private/public key pair, a Cable-Labs' or Manufacturer's RSA public key and Critical Security Parameter (CSP); the middle-level security information includes a CableLabs' or manufacturer's certificate; and the absolute anti-alteration information includes CM's certificate and boot-loader.

* * * * *